(12) United States Patent
Ono

(10) Patent No.: US 7,401,200 B2
(45) Date of Patent: Jul. 15, 2008

(54) INFORMATION PROCESSING APPARATUS, MEMORY MANAGING PROGRAM, AND MEMORY MANAGING METHOD

(75) Inventor: Yoshiyuki Ono, Hino (JP)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 11/155,538

(22) Filed: Jun. 20, 2005

(65) Prior Publication Data

US 2006/0010283 A1   Jan. 12, 2006

(30) Foreign Application Priority Data

Jul. 7, 2004   (JP) ............... 2004-200559

(51) Int. Cl.
*G06F 12/00* (2006.01)
*G06F 1/26* (2006.01)

(52) U.S. Cl. .............. 711/202; 711/103; 711/203; 713/320; 713/323

(58) Field of Classification Search .............. None
See application file for complete search history.

(56) References Cited

U.S. PATENT DOCUMENTS

| 5,860,138 | A | * | 1/1999 | Engebretsen et al. ........ 711/202 |
| 6,209,088 | B1 | | 3/2001 | Reneris |
| 6,327,509 | B1 | * | 12/2001 | Ashida ........................ 700/5 |
| 6,591,328 | B1 | | 7/2003 | Iida et al. |
| 7,108,605 | B2 | * | 9/2006 | LeMay et al. ................ 463/43 |
| 2002/0103984 | A1 | * | 8/2002 | Yamashima ................ 711/165 |

FOREIGN PATENT DOCUMENTS

| CN | 1243317 A | 2/2000 |
| EP | 0 749 063 A2 | 12/1996 |
| EP | 1 037 133 A1 | 9/2000 |
| EP | 1 306 758 A2 | 5/2003 |
| EP | 1 424 631 A1 | 6/2004 |
| JP | A-4-37916 | 2/1992 |
| JP | A 9-114557 | 5/1997 |
| KR | A 2000-0038957 | 7/2000 |

* cited by examiner

*Primary Examiner*—Hyung Sough
*Assistant Examiner*—Kaushikkumar Patel
(74) *Attorney, Agent, or Firm*—Oliff & Berridge, PLC

(57) ABSTRACT

It is an object of the invention to perform memory management for power control appropriately in an information processing apparatus including a non-volatile memory. The information processing apparatus attaches peculiar memory block names to memory blocks allocated in a storage area of the non-volatile memory, respectively, and uses a memory management table for identifying the memory blocks according to the memory block names to perform memory management for the non-volatile memory. When a power supply is turned on again, an application designates a memory block name, whereby the memory block name is searched in the non-volatile memory and data of a memory block corresponding to the memory block name is accessed. Therefore, it is possible to perform memory management for power control appropriately in the information processing apparatus including the non-volatile memory.

11 Claims, 5 Drawing Sheets

*FIG. 2*

| FUNCTION | CONTENTS |
|---|---|
| NVAllocateNamedMemory<br>in unit32 ID<br>in unit32 MemorySize<br>out unit32 MemoryAddress | ATTACH NAME AND ALLOCATE MEMORY BLOCK<br>MEMORY BLOCK NAME (ASCII CODE×4)<br>CAPACITY TO BE ALLOCATED<br>0:ERROR(NOT PRESENT),OTHER THAN 0:STARTING ADDRESS OF ALLOCATED MEMORY BLOCK |
| NVGetNamedMemoryAddress<br>in unit32 ID<br>out unit32 MemoryAddress | DESIGNATE NAME AND SEARCH EXISTING MEMORY BLOCKS<br>MEMORY BLOCK NAME (ASCII CODE×4)<br>0:ERROR(NOT PRESENT),OTHER THAN 0:STARTING ADDRESS OF SEARCHED MEMORY BLOCK |
| NVFreeNamedMemory<br>in unit32 ID<br>out unit32 ResultCode | DESIGNATE NAME AND RELEASE EXISTING MEMORY BLOCK<br>MEMORY BLOCK NAME (ASCII CODE×4)<br>0:SUCCESS,1:ERROR DETECTION |

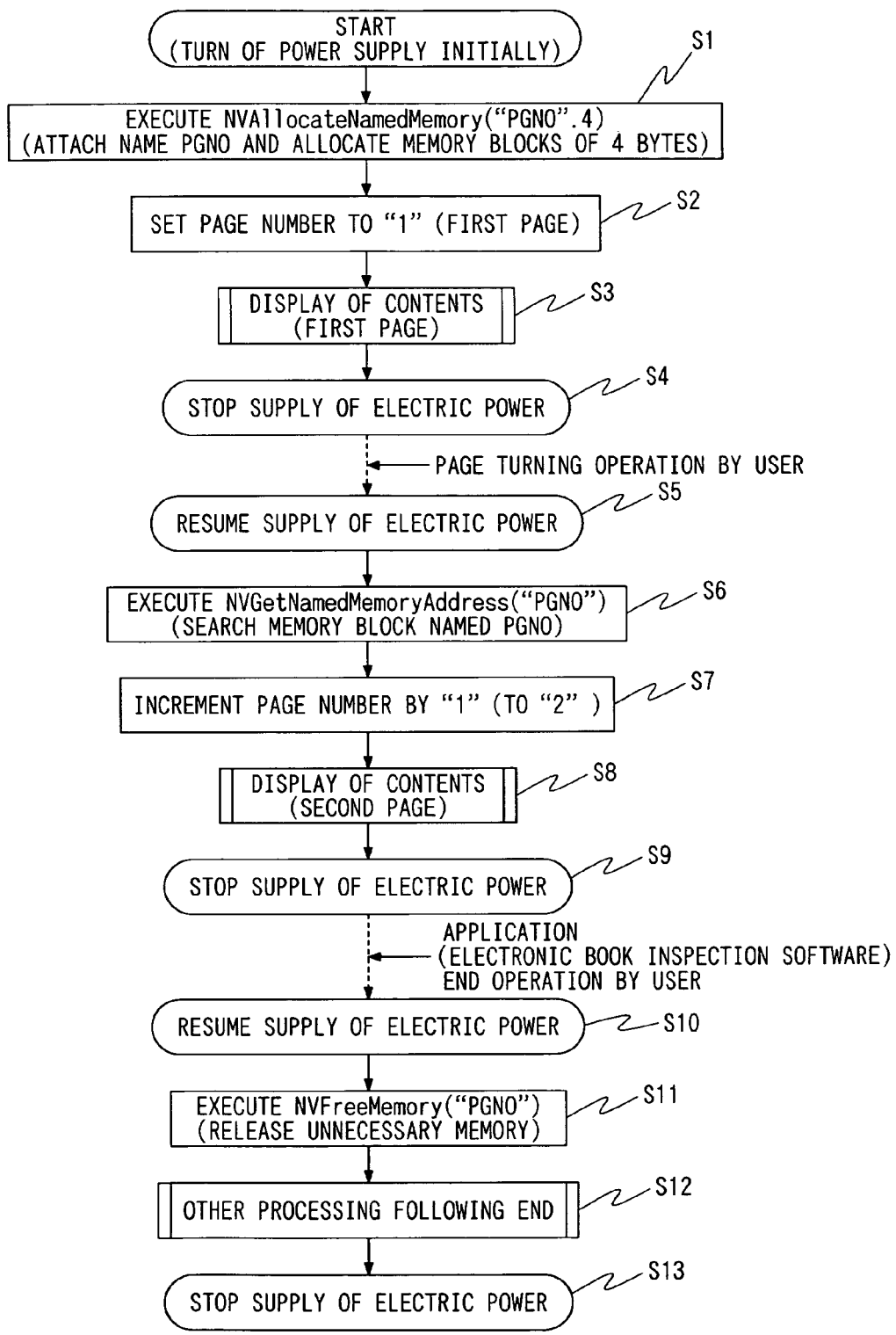

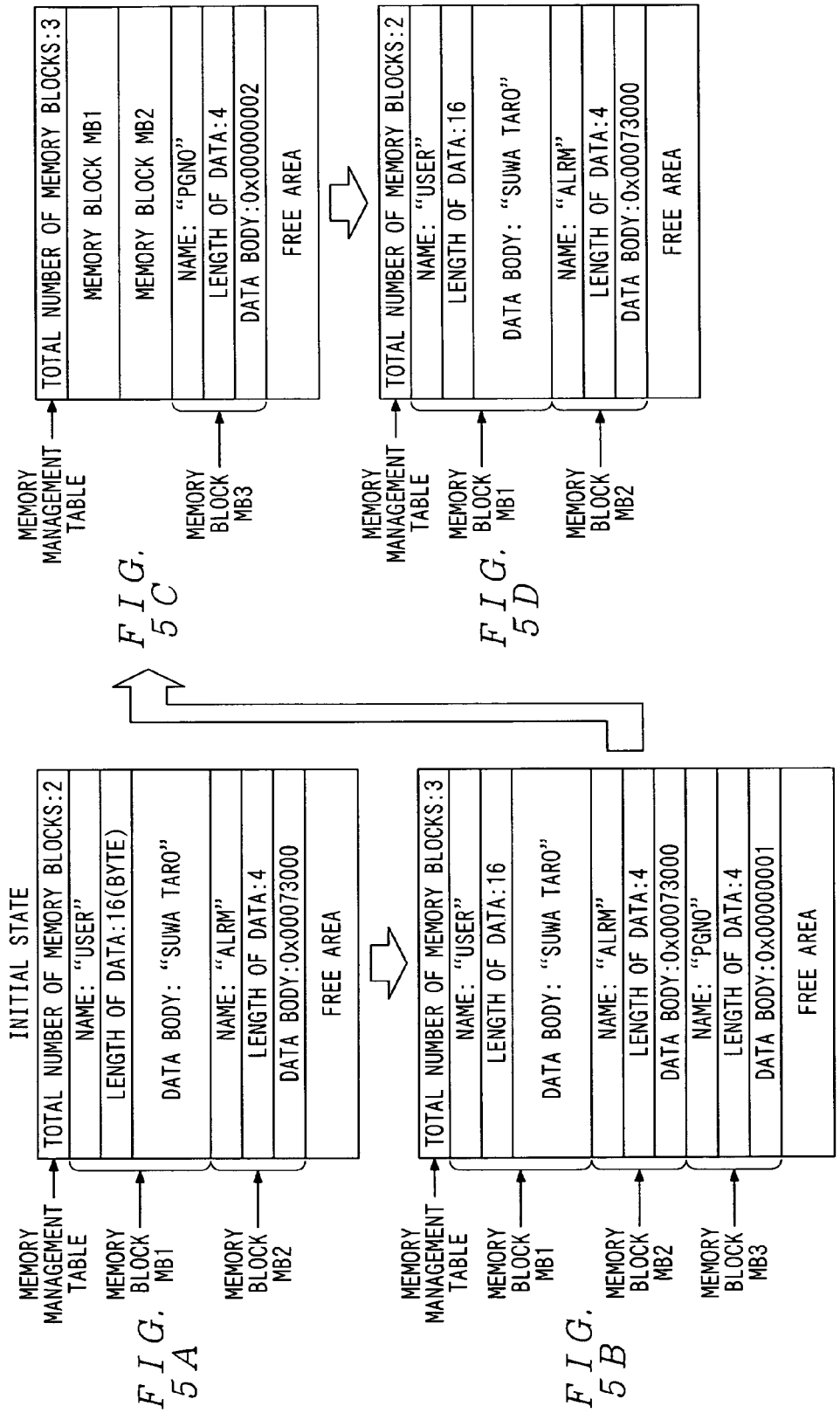

INFORMATION PROCESSING APPARATUS, MEMORY MANAGING PROGRAM, AND MEMORY MANAGING METHOD

BACKGROUND OF THE INVENTION

1. Field of the Invention

The present invention relates to an information processing apparatus that is capable of autonomously controlling supply of electric power inside the apparatus and a memory managing program and a memory managing method for the information processing apparatus.

2. Description of the Related Art

In recent years, in the field of the computer system technology, power control techniques for reducing power consumption at standby time by stopping supply of electric power inside an apparatus when processing is not performed and resuming the supply of electric power instantaneously when processing is required, for example, when input operation is applied to the apparatus have been developed.

In addition, in recent years, non-volatile memories such as a Ferroelectric Random Access Memory (FeRAM) and a Magneto-resistive Random Access Memory (MRAM) have been developed. Such non-volatile memories do not require electric power for maintaining storage of information. Thus, for example, even when the power control described above is performed and supply of electric power to the memory is stopped, information, which is stored before the supply of electric power is stopped, is held on the memory.

Since it is possible to access such non-volatile memories at high speed, it is expected that the non-volatile memories are used as general-purpose memories in computer systems.

Incidentally, in the conventional software techniques, as in the power control techniques described above, it is not assumed in principle that processing is resumed after power supply to a computer is suspended temporarily. In restarting the computer, in general, operating system software (OS) performs start involving initialization of a system (so-called cold start).

Note that, concerning the power control for the computer systems, for example, JP9-114557A discloses a technique such as suspend or resume.

However, in the conventional computer systems, when the memory is managed, a method of managing a starting address of an area in use on the memory and, in allocating or releasing the memory, designating the starting address of the area is used.

Therefore, even when the non-volatile memories such as the FeRAM and the MRAM are used, when supply of power is suspended as described above and the supply of power is resumed as required by processing, there is a problem in that management information of a memory address is lost and the information stored on the memory cannot be accessed as the OS performs the cold start.

When the OS performs the processing such as suspend or resume, the management information of the memory address is stored in a storage such as a hard disk. Thus, it is possible to access the information on the memory even when the power supply of the computer is turned on again.

However, the conventional processing such as suspend or resume is not processing that assumes use of a non-volatile memory. There is a problem in that it is necessary to save a large quantity of information in the memory or the hard disk in executing the processing and, when the power supply of the computer is turned on again, the information does not surely return to an original state in some cases.

SUMMARY OF THE INVENTION

It is an object of the invention to perform memory management for power control appropriately in an information processing apparatus including a non-volatile memory.

In order to solve the problems, the invention provides an information processing apparatus that autonomously controls supply of electric power inside the apparatus, including: anon-volatile memory that holds stored information in a non-volatile manner (e.g., a non-volatile memory 40 in FIG. 1); and a non-volatile memory managing section (e.g., a CPU 50 constituting a non-volatile memory managing module in FIG. 3) that attaches peculiar memory block names to memory blocks (e.g., memory blocks MB1 to MB3 in FIG. 3) in a storage of the non-volatile memory, generates memory management information (e.g., a memory management table in FIG. 3) for identifying the memory blocks using the memory block names, and stores the memory management information in the non-volatile memory.

Consequently, in the information processing apparatus that includes the non-volatile memory and repeats restarting according to power control, it is possible to use data held in the non-volatile memory at the time when a power supply is turned on again.

In other words, in the information processing apparatus including the non-volatile memory, it is possible to perform memory management for power control appropriately.

When supply of power to the apparatus is resumed after the supply of power is suspended, the non-volatile memory managing section searches storage areas in the non-volatile memory on the basis of the memory block names and accesses information stored in the memory blocks corresponding to the memory block names.

Consequently, when the power supply is turned on again, the memory management information of the non-volatile memory is referred to promptly and it is possible to use the information held in the non-volatile memory.

When the memory blocks become unnecessary, the non-volatile memory managing section searches storage areas in the non-volatile memory on the basis of the memory block names of the memory blocks and releases the memory blocks.

Consequently, it is also possible to release the memory blocks in the non-volatile memory by designating the memory block names and use the storage areas effectively.

The information processing apparatus further includes: a volatile memory (e.g., a volatile memory 30 in FIG. 1) that is capable of reading out data from and writing data at higher speed than the non-volatile memory; and an indirect access section (e.g., the CPU 50 in FIG. 1) that stores information, which is stored in the storage areas of the non-volatile memory, in the volatile memory and accesses the information stored in the volatile memory instead of the non-volatile memory.

Consequently, it is possible to use the information stored in the non-volatile memory via the volatile memory that can perform readout and writing at high speed.

When the non-volatile memory managing section is required to access the memory blocks corresponding to the memory block names, the non-volatile memory managing section accesses information stored in the memory blocks directly on the basis of the memory management information.

Consequently, since it is possible to directly read out the information from and write the information in the non-volatile memory, it is possible to use the entire storage areas efficiently without occupying storage areas of other memories.

The non-volatile memory managing section attaches names consisting of arbitrary character strings as the memory block names.

Consequently, it is possible to attach names that are easily recognized by a user or an application.

The non-volatile memory managing section attaches names of a size, which corresponds to a data width for treating data in the own apparatus, as the memory block names.

Consequently, it is possible to attach memory block names consistent with hardware and realize an increase in speed of processing.

The non-volatile memory managing section attaches names, which consist of characters of a number obtained by dividing the data width in treating data in the own apparatus by "8", as the memory block names.

Consequently, it is possible to attach data block names of a size within the data width in treating data in the own apparatus and realize an increase in speed of processing.

The information processing apparatus includes a predetermined processor (e.g., the CPU 50 in FIG. 1) connected to the non-volatile memory by a data line. The non-volatile memory managing section attaches names of a size, which is suited to a data width of the data line, as the memory block names.

Consequently, it is possible to transmit the memory block names in one clock between the processor and the non-volatile memory.

The information processing apparatus includes a predetermined processor that has a register for storing information to be an object of arithmetic operation. The non-volatile memory managing section attaches names of a size, which is suited to a size of a data width of the register, as the memory block names.

Consequently, it is possible to perform processing for writing the memory block names in the register and reading the memory block names from the register at a time in the processor.

The information processing apparatus includes a predetermined processor (e.g., the CPU 50 in FIG. 1) that has an ALU for applying arithmetical or logical operation to information to be an object of arithmetic operation. The non-volatile memory managing section attaches names of a size, which is suited to an input data width of the ALU, as the memory block names.

Consequently, it is possible to perform processing for comparing memory block names at a time in the ALU and perform processing for searching the memory blocks in the non-volatile memory at high speed.

The invention provides a memory managing program stored in a computer readable storage medium, for controlling an information processing apparatus that autonomously controls supply of electric power inside the apparatus. The memory managing program causes the information processing apparatus to realize a non-volatile memory management function of attaching peculiar memory block names to memory blocks in storage areas of a non-volatile memory, which holds stored information in a non-volatile manner, provided in the information processing apparatus, generating memory management information for identifying the memory blocks according to the memory block names, and storing the memory management information in the non-volatile memory.

The invention provides a memory managing method in an information processing apparatus that autonomously controls supply of electric power inside the apparatus. The memory managing method includes a non-volatile memory managing step of attaching peculiar memory block names to memory blocks in storage areas of a non-volatile memory, which holds stored information in a non-volatile manner, provided in the information processing apparatus, generating memory management information for identifying the memory blocks according to the memory block names, and storing the memory management information in the non-volatile memory.

In this way, according to the invention, in the information processing apparatus including the non-volatile memory, it is possible to perform memory management for power control appropriately and reduce power consumption of the information processing apparatus significantly.

BRIEF DESCRIPTION OF THE DRAWINGS

In the accompanying drawings:

FIG. 2 is a table specifically showing an API constituting a non-volatile memory management module;

FIG. 4 is a flowchart showing a specific example of an operation of the information processing apparatus 1; and FIG. 5 is a diagram showing transition of a memory map in the non-volatile memory 40.

DETAILED DESCRIPTION OF THE PREFERRED EMBODIMENTS

An embodiment of an information processing apparatus according to the invention will be hereinafter explained with reference to the accompanying drawings.

First, a structure of the information processing apparatus will be explained.

Figure 1:
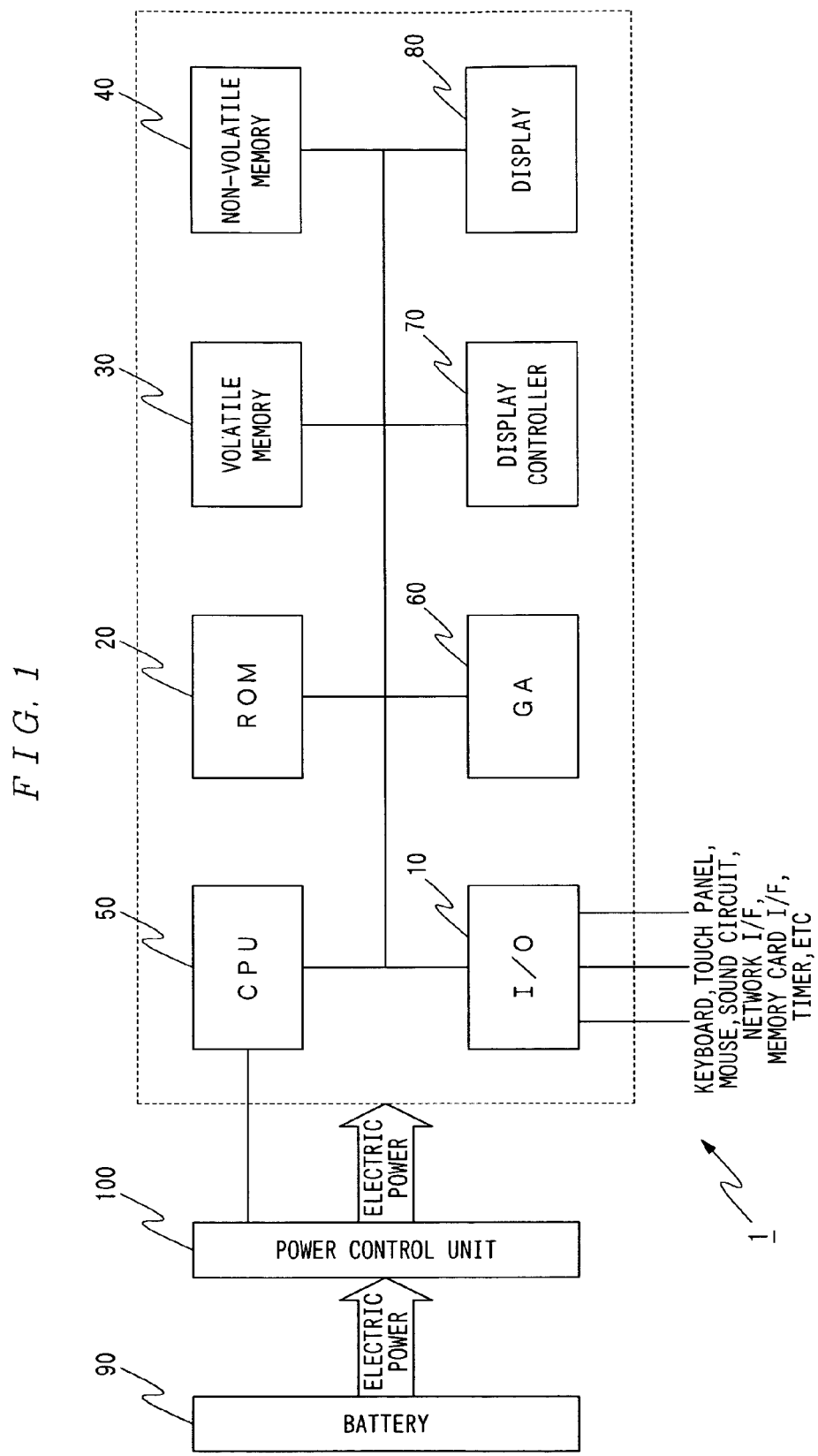
FIG. 1 is a block diagram showing a functional structure of an information processing apparatus 1 according to the invention.

FIG. 1 is a block diagram showing a functional structure of an information processing apparatus 1 according to the invention.

Note that, in an example explained here, contents of an electronic book are inspected using the information processing apparatus 1.

In FIG. 1, the information processing apparatus 1 includes an Input/Output (I/O) unit 10, a Read Only Memory (ROM) 20, a volatile memory 30, a non-volatile memory 40, a Central Processing Unit (CPU) 50, a Graphic Accelerator (GA) 60, a display controller 70, a display 80, a power control unit 90, and a battery 100.

The I/O unit 10 is a port through which the information processing apparatus 1 outputs signals to and receives signals from the various devices. The information processing apparatus 1 outputs signals to and receives signals from, via the I/O unit 10, input devices such as a keyboard, a touch panel, a mouse, and operation buttons provided in a main body of the information processing apparatus 1, sound input/output devices such as a speaker and a microphone, various interfaces (I/Fs) such as a network interface and a memory card interface, and various peripheral circuits such as a timer.

Note that, in this embodiment, the contents of the electronic book is stored in a memory card and provided. The memory card is inserted into a memory card I/F, whereby the contents are inspected via the I/O unit 10.

The ROM 20 is constituted by a non-volatile memory such as a flash ROM. An operating system program (OS), an application program, and a memory block name (described later) are stored in the ROM 20.

The operating system program stored in the ROM 20 includes a non-volatile memory management module that manages a storage area of the non-volatile memory 40.

The non-volatile memory management module is an Application Program Interface (API) that performs memory management for the non-volatile memory 40. The non-volatile memory management module includes functions of the API shown in FIG. 2.

FIG. 2 is a diagram specifically showing the API constituting the non-volatile memory management module.

In FIG. 2, "NVAllocateNamedMemory" is a function for, when the information processing apparatus 1 is required to store data in the non-volatile memory 40 in performing processing, giving peculiar names (memory block names) designated as arguments to areas for storing the data to allocate the areas.

"NVGetNamedMemoryAddress" is a function for searching the areas with the memory block names designated as the arguments in the non-volatile memory 40.

"NVFreeNamedMemory" is a function for releasing the areas with the memory block names designated as the arguments.

Here, it is possible to set the memory block names as arbitrary character strings. In addition, it is possible to give names of a size with which processing for searching memory blocks from a storage of the non-volatile memory 40 is further increased in speed.

For example, it is conceivable to set a size of the memory block names to a size suited to a data width of the CPU 50. In this case, it is possible to set a size of the memory block names to a size suited to a data width of a data line (a data bus) connecting the CPU 50 and the non-volatile memory 40, an input data line of an Arithmetic Logical Unit (ALU) provided inside the CPU 50, a data width of a register of a register file provided inside the CPU 50, and the like.

In this way, a size of the memory block names is set to a size suited to the various data widths in the CPU 50. This makes it possible to transfer and compare codes of the memory blocks by performing processing once.

A size of the memory block names is suited to a data width of a data line connecting the CPU 50 and the non-volatile memory 40. This makes it possible to transmit the memory block names in one clock on the data line connecting the non-volatile memory 40 and the CPU 50. In addition, a size of the memory block names is suited to an input data width of the ALU provided inside the CPU 50. This makes it possible to perform processing for comparing a key memory block name and the respective memory block names on the non-volatile memory 40 using the ALU at a time. Moreover, a size of the memory block names is suited to a data width of a register of a register file provided inside the CPU 50. This makes it possible to perform processing for writing the memory block names in and reading out the memory block names from the register file at a time.

Therefore, speed of processing for searching a memory block with the key memory block name from the storage area of the non-volatile memory 40 is increased.

Referring back to FIG. 1, the volatile memory 30 is constituted by a volatile memory such as a Dynamic Random Access Memory (DRAM), a Static Random Access Memory (SRAM), or a Synchronous DRAM (SDRAM). When the CPU 50 executes processing, the volatile memory 30 forms a work area and stores a result of the processing.

The volatile memory 30 is also capable of storing starting addresses of the respective memory blocks stored in the non-volatile memory 40.

The non-volatile memory 40 is constituted by a non-volatile memory such as a Ferroelectric Random Access Memory (FRAM) or a Magneto-resistive Random Access Memory (MRAM). For example, when contents of an electronic book are inspected, data, which is required to be saved-even when a power supply of the information processing apparatus 1 is disconnected, such as a number of a page under inspection is stored.

Note that, as described above, it is possible to constitute the non-volatile memory 40 with a non-volatile memory that does not require backup by a power supply. In addition, it is also possible to back up a volatile memory such as an SRAM with a dedicated power supply to use the volatile memory as a pseudo-non-volatile memory.

Here, a memory map of a memory space constituted by the non-volatile memory 40 will be explained.

Figure 3:
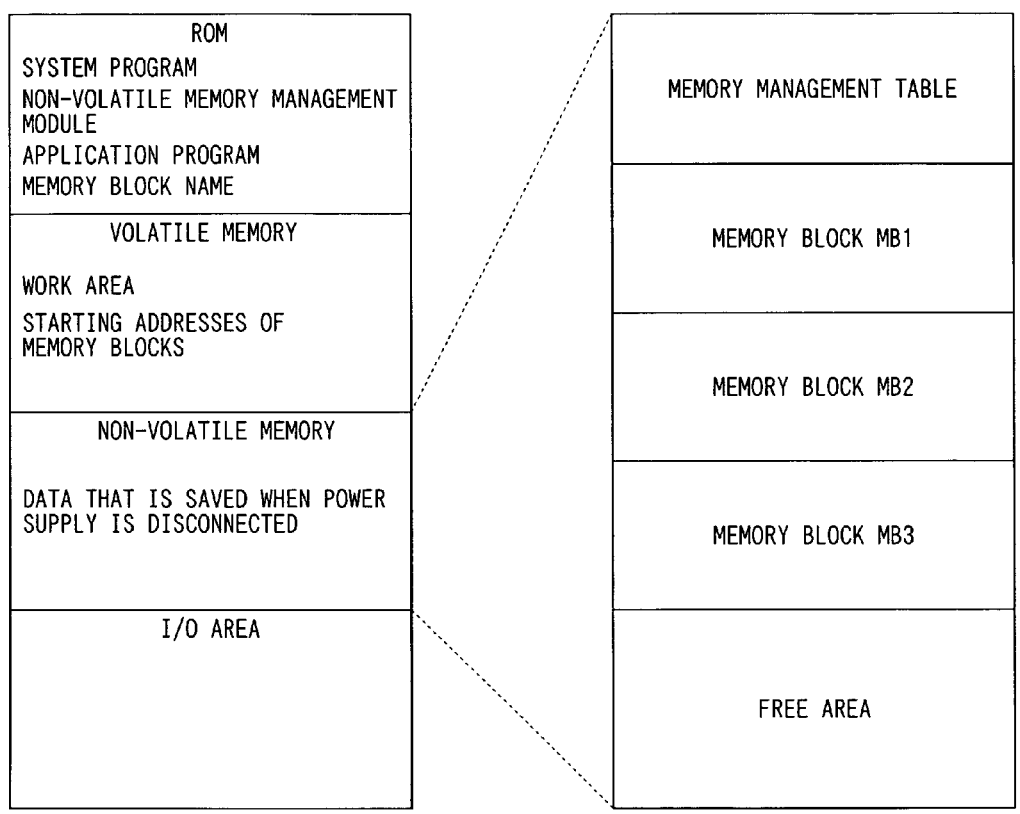
FIG. 3 is a memory map of a memory space included in the information processing apparatus 1.

FIG. 3 is a diagram showing a memory map of a memory space held by the information processing apparatus 1.

In FIG. 3, the memory space held by the information processing apparatus 1 includes a ROM area that is a storage area of the ROM 20, a volatile memory area and an I/O area that is storage areas of the volatile memory 30, and a non-volatile memory area that is a storage area of the non-volatile memory 40.

Moreover, the non-volatile memory area includes a memory management table area, memory blocks MB1 to MB3, and a free space.

The memory management table area is an area for storing data in a table form (a memory management table) for associating names of memory blocks (memory block names) and addresses of storage areas corresponding to the memory block names.

The memory management table is management information on memory addresses in the non-volatile memory 40. Therefore, this memory management table is stored in the non-volatile memory area, whereby, even when the power supply of the information processing apparatus 1 is disconnected, it is possible to use data stored in the respective memory blocks of the non-volatile memory area when the power supply is turned on again.

Note that the memory management table includes the number of memory blocks, memory block names, and a size of the memory blocks (data for grasping addresses of the memory blocks). However, in the explanation of this embodiment, it is assumed that only the number of all memory blocks allocated to the non-volatile memory 40 is stored in the memory management table area and the other pieces of memory management information are included in the respective memory blocks. In this case, again, the number of memory blocks, memory block names, and a size of the memory blocks (data for specifying addresses of the memory blocks) substantially constitute memory management information.

The memory blocks MB1 to MB3 are areas allocated by the non-volatile memory management module. Various data, which are required to be saved even when a power supply is disconnected, are stored in the memory blocks MB1 to MB3. Note that, here, a state, in which the three memory blocks MB1 to MB3 are allocated, is illustrated as an example. However, memory blocks of a necessary number and a necessary size are allocated according to processing in the information processing apparatus 1.

When the data stored in any one of the memory blocks MB1 to MB3 is made unnecessary, the memory block storing the unnecessary data is released to be a free area by the non-volatile memory management module.

The free area is an unused area in the non-volatile memory 40. The non-volatile memory management module allocates a memory block from this free area.

Referring back to FIG. 1, the CPU 50 is a unit that controls the entire information processing apparatus 1. The CPU 50 reads out and executes an operating system program or an application program stored in the ROM 20 in accordance with various instruction signals that are inputted via the I/O unit 10. When the CPU 50 executes the operating system program, a function of the non-volatile memory management module is realized. Then, the CPU 50 stores results of various kinds of processing in a predetermined area of the volatile memory 30 or the non-volatile memory 40.

For example, when input operation is applied to the information processing apparatus 1, the CPU 50 turns on the power supply to perform processing only when an operation is required. When an operation is unnecessary, the CPU 50 performs power control via the power control unit 90 so as to disconnect the power supply. Therefore, the CPU 50 stores data, which is required to be saved even when the power supply is disconnected, like information required by the OS such as a memory management table and information required by an application such as a page number of an electronic book under inspection in the non-volatile memory 40.

The GA 60 is a hardware that performs at high speed rendering processing for an image to be displayed on the display 80 in accordance with an instruction of the CPU 50. Specifically, the GA 60 performs processing for expanding a vector figure inputted from the CPU 50 into a raster figure. Then, the GA 60 outputs rendering data for rendering the image subjected to rendering processing on the display 80 to the display controller 70.

The display controller 70 controls the display 80 directly and causes the display 80 to display the rendering data inputted from the GA 60.

Specifically, the display controller 70 drives an X driver and a Y driver of the display 80 with reference to the rendering data inputted from the GA 60 to thereby cause the display 80 to display the raster figure that is a rendering object.

The display 80 is constituted by, for example, a high pixel density (multi-pixel) display device of an A4 size. The display 80 displays pixel data on predetermined pixels according to control of the display controller 70.

In addition, the display 80 is a display device having a memory property (a display device in which a display screen is maintained even if a power supply is disconnected). Thus, since electric power is unnecessary for maintaining a state of the display screen, it is possible to further reduce power consumption by the information processing apparatus 1.

Note that, as the display 80, it is possible to adopt, for example, an electrophoretic display, a cholesteric liquid crystal display, a display using charged toner, a display using a twist ball, an electro-deposition display, or the like.

The power control unit 90 controls supply of electric power from the battery 100 to the respective units of the information processing apparatus 1 in accordance with an instruction of the CPU 50.

The battery 100 is a primary battery or a secondary battery that supplies electric power to the information processing apparatus 1 via the power control unit 90.

Next, an operation of the information processing apparatus 1 will be explained.

In the information processing apparatus 1 in this embodiment, under the constitution described above, a power supply is turned on only when an operation of the information processing apparatus is necessary, for example, when input operation is performed. When the necessary operation ends, the power supply is turned off. In addition, at this point, data, which is required to be saved even when the power supply is disconnected, such as a page number of contents of an electronic book under inspection and a memory management table, is stored in the non-volatile memory 40. When the power supply is turned on again, the data stored in the non-volatile memory 40 is made usable.

Assuming that a user turns on the power supply initially after, for example, replacing a battery and, after turning a page while reading contents of an electronic book, at a point when the user finishes reading a second page, the user ends inspection of the contents, a specific example of an operation of the information processing apparatus 1 in this case will be explained.

FIG. 4 is a flowchart showing a specific example of an operation of the information processing apparatus 1. FIG. 5 is a diagram showing transition of a memory map in the non-volatile memory 40 in this case. Note that FIG. 5(*a*) is a memory map showing an initial state at the time when the flowchart shown in FIG. 4 is executed. Two memory blocks "USER" and "ALRM" used by other applications are allocated in the memory map.

In FIG. 4, after a battery is replaced (or the information processing apparatus is shipped from a factory), when the user turns on the power supply of the information processing apparatus 1 initially, the CPU 50 executes the function "NVAllocateNamedMemory" with a memory block name "PGNO" as an argument and, as shown in FIG. 5(*b*), allocates memory blocks for four bytes in the storage area of the non-volatile memory 40 (step S1). This "PGNO" is a memory block name that inspection software of an electronic book uses exclusively in order to manage a page under inspection.

Subsequently, the CPU 50 sets a page number "1" (first page) as actual data of the allocated memory blocks (step S2). The CPU 50 reads out contents of the first page from the memory card and displays the contents on the display 80 (step S3).

Then, the CPU 50 stops the supply of electric power from the battery 100 to the information processing apparatus 1 (step S4). In other words, the power supply of the information processing apparatus 1 is disconnected while a screen is displayed on the display 80 and the information processing apparatus 1 does not consume electric power.

Thereafter, when a button is operated by the user and an instruction for turning a page is inputted, this button operation acts as a trigger for turning on the power supply to resume supply of the electric power to the information processing apparatus 1 (step S5). The CPU 50 executes the function "NVGetNamedMemoryAddress" with the memory block name "PGNO" as an argument (step S6). In other words, in step S6, an area of the memory block name "PGNO" is retrieved from the non-volatile memory 40.

Then, as shown in FIG. 5(*c*), the CPU 5 increments a page number in the area of the retrieved memory block name "PGNO" by "1" to "2" indicating a second page (step S7).

Subsequently, the CPU 50 reads out contents of the second page from the memory card and displays the contents on the display 80 (step S8).

Then, the CPU 50 stops the supply of electric power from the battery 100 to the information processing apparatus 1 and the power supply is disconnected again (step S9).

Thereafter, when the user operates a button to input an instruction for ending the inspection of the electronic book, this button operation acts as a trigger for turning on the power supply to resume the supply of electric power to the information processing apparatus 1 (step S10). The CPU 50 executes the function "NVFreeMemory" with the memory block name "PGNO" as an argument (step S11). In other words, in step S11, as shown in FIG. 5(d), the unnecessary area of the memory block name "PGNO" is deleted from the non-volatile memory 40 to form a free area.

Moreover, the CPU 50 performs various kinds of processing following the end of the inspection software for the electronic book (e.g., release of the area used in the volatile memory 30) (step S12), stops the supply of electric power from the battery 100 to the information processing apparatus 1 and the power supply is disconnected again (step S13).

Note that, in step S13, the power supply of the information processing apparatus 1 is disconnected and the processing of the specific example of an operation described here ends. However, when an operation in the information processing apparatus 1 is required, for example, when the user operates a button, the supply of electric power is resumed promptly and the CPU 50 performs a predetermined processing. Then, at this point, when the supply of electric power is resumed, the CPU 50 (the non-volatile memory management module) searches a storage area on the non-volatile memory 40 with a memory block name as a key.

As described above, the information processing apparatus 1 according to this embodiment attaches peculiar memory block names to memory blocks allocated in the storage area of the non-volatile memory 40, respectively and uses the memory management table for identifying the memory blocks according to the memory block names to perform memory management for the non-volatile memory 40. Then, when the power supply is turned on again, an application designates a memory block name, whereby the memory block name is retrieved in the non-volatile memory 40 and data of a memory block corresponding to the memory block name is accessed.

Therefore, in the information processing apparatus that includes the non-volatile memory and repeats restarting according to power control, it is possible to use data held in the non-volatile memory at the time when the power supply is turned on again.

In the information processing apparatus including the non-volatile memory, it is possible to perform memory management for power control appropriately. Consequently, it is possible to reduce power consumption in the information processing apparatus significantly.

Note that, in the explanation of this embodiment, it is assumed that only the number of memory blocks is stored in the memory management table and memory block names and a size of the memory blocks are stored in the non-volatile memory 40 together with actual data of the memory blocks. However, the memory block names and the size of the memory blocks may be included in the memory management table to be managed.

As a method of giving memory block names, as described above, other than suiting a size of the memory block names to a data width of a data bus, an input data width of an ALU, or a data width of a register as described above, it is possible to set the memory block names as an arbitrary character string or an arbitrary numerical value. In general, it is desirable to set a size of the memory blocks to the number of characters obtained by dividing a data width treated in the information processing apparatus 1 by eight (bits) equivalent to one character of the ASCII code.

In addition, in the explanation of this embodiment, the non-volatile memory 40 is accessed directly to read out data from and write data in the non-volatile memory 40. However, in general, since a volatile memory is capable of operating faster than a non-volatile memory, it is also possible that data stored in the non-volatile memory 40 is copied to the volatile memory 30 and the data stored in the volatile memory 30 is used. In this way, an OS or an application is capable of performing processing for copying data stored in the non-volatile memory 40 to the volatile memory 30 and using it.

What is claimed is:

1. An information processing apparatus that autonomously controls supply of electric power inside the apparatus, comprising:
    a non-volatile memory that holds stored information in a non-volatile manner; and
    a non-volatile memory managing section that attaches peculiar memory block names to memory blocks in a storage of the non-volatile memory, generates memory management information for identifying the memory blocks using the memory block names, and stores the memory management information in the non-volatile memory, wherein
    when supply of power to the apparatus is resumed after the supply of power is suspended, the non-volatile memory managing section searches storage areas in the non-volatile memory on the basis of the memory block names and accesses information stored in the memory blocks corresponding to the memory block names, and attaches names of a size, which corresponds to a data width for treating data in the apparatus, as the memory block names.

2. The information processing apparatus according to claim 1, wherein, when the memory blocks become unnecessary, the non-volatile memory managing section searches storage areas in the non-volatile memory on the basis of the memory block names of the memory blocks and releases the memory blocks.

3. The information processing apparatus according to claim 1, further comprising:
    a volatile memory that is capable of reading out data and writing data at higher speed than the non-volatile memory; and
    an indirect access section that stores information in the volatile memory, which is stored in the storage areas of the non-volatile memory, and accesses the information stored in the volatile memory instead of the non-volatile memory.

4. The information processing apparatus according to claim 1, wherein, when the non-volatile memory managing section is required to access the memory blocks corresponding to the memory block names, the non-volatile memory managing section accesses information stored in the memory blocks directly on the basis of the memory management information.

5. The information processing apparatus according to claim 1, wherein the non-volatile memory managing section attaches names consisting of arbitrary character strings as the memory block names.

6. The information processing apparatus according to claim 1, wherein the non-volatile memory managing section attaches names, which consist of characters of a number obtained by dividing the data width in treating data in the apparatus by "8" as the memory block names.

7. The information processing apparatus according to claim 1, further comprising a predetermined processor connected to the non-volatile memory by a data line, wherein
    the non-volatile memory managing section attaches names of a size, which is suited to a data width of the data line, as the memory block names.

8. The information processing apparatus according to claim 1, further comprising a predetermined processor that has a register for storing information to be an object of operation, wherein the non-volatile memory managing section attaches names of a size, which is suited to a size of a data width of the register, as the memory block names.

9. The information processing apparatus according to claim 1, further comprising a predetermined processor that has an Arithmetic Logic Unit for applying arithmetical or logical operation to information to be an object of arithmetic operation, wherein the non-volatile memory managing section attaches names of a size, which is suited to an input data width of the Arithmetic Logic Unit, as the memory block names.

10. A memory managing program, stored in a computer readable storage medium, for controlling an information processing apparatus that autonomously controls supply of electric power inside the apparatus, the memory managing program causing the information processing apparatus to realize a non-volatile memory management function of attaching peculiar memory block names to memory blocks in storage areas of a non-volatile memory, which holds stored information in a non-volatile manner, provided in the information processing apparatus, generating memory management information for identifying the memory blocks according to the memory block names, and storing the memory management information in the non-volatile memory, wherein when supply of power to the apparatus is resumed after the supply of power is suspended, the non-volatile memory managing function searches storage areas in the non-volatile memory on the basis of the memory block names and accesses information stored in the memory blocks corresponding to the memory block names, and attaches names of a size, which corresponds to a data width for treating data in the apparatus, as the memory block names.

11. A memory managing method in an information processing apparatus that autonomously controls supply of electric power inside the apparatus, the memory managing method comprising a non-volatile memory managing step of attaching peculiar memory block names to memory blocks in storage areas of a non-volatile memory, which holds stored information in a non-volatile manner, provided in the information processing apparatus, generating memory management information for identifying the memory blocks according to the memory block names, and storing the memory management information in the non-volatile memory, wherein when supply of power to the apparatus is resumed after the supply of power is suspended, the non-volatile memory managing step searches storage areas in the non-volatile memory on the basis of the memory block names and accesses information stored in the memory blocks corresponding to the memory block names, and attaches names of a size, which corresponds to a data width for treating data in the apparatus, as the memory block names.

* * * * *